Dec. 13, 1932.  C. M. F. FRIDEN  1,890,776
CALCULATING MACHINE
Filed Sept. 1, 1928  6 Sheets-Sheet 1

INVENTOR
Carl M. F. Friden
BY White Prost + Fryer
his ATTORNEYS

Dec. 13, 1932.  C. M. F. FRIDEN  1,890,776
CALCULATING MACHINE
Filed Sept. 1, 1928  6 Sheets-Sheet 2

Dec. 13, 1932.   C. M. F. FRIDEN   1,890,776
CALCULATING MACHINE
Filed Sept. 1, 1928   6 Sheets-Sheet 4

INVENTOR
Carl M. F. Friden
BY White Prost & Fryer
his ATTORNEYS

Dec. 13, 1932.   C. M. F. FRIDEN   1,890,776
CALCULATING MACHINE
Filed Sept. 1, 1928   6 Sheets-Sheet 5

INVENTOR
Carl M. F. Friden
BY White Prost & Fryer
his ATTORNEYS

Dec. 13, 1932.　　C. M. F. FRIDEN　　1,890,776
CALCULATING MACHINE
Filed Sept. 1, 1928　　6 Sheets-Sheet 6

FIG_6_

FIG_7_

INVENTOR.
Carl M. F. Friden
BY White, Frost & Fryer
ATTORNEYS.

Patented Dec. 13, 1932

1,890,776

UNITED STATES PATENT OFFICE

CARL M. F. FRIDEN, OF OAKLAND, CALIFORNIA, ASSIGNOR TO MARCHANT CALCULATING MACHINE COMPANY, OF EMERYVILLE, CALIFORNIA, A CORPORATION OF CALIFORNIA

CALCULATING MACHINE

Application filed September 1, 1928. Serial No. 303,387.

The invention relates to motor driven calculating machines of the movable carriage type and particularly to means for moving the carriage to the next numerical order when multiplication in one order has been completed.

An object of the invention is to provide a motor driven calculating machine with means which functions when the machine is performing problems in multiplication to automatically shift the carriage on which the product register is mounted, one step, upon the completion of the multiplying operation in one numerical order.

Another object of the invention is to provide a motor driven calculating machine, having keys for predetermining the number of operations of the actuator, in a multiplying operation, with means for shifting the carriage one step at the conclusion of the predetermined number of operations.

Another object of the invention is to provide, in a motor driven calculating machine having means for automatically shifting the carriage at the conclusion of a calculation in one numerical order, means for disabling the automatic carriage shifting means, when the machine is set for the performance of problems in addition or subtraction.

The invention possesses other advantageous features, some of which with the foregoing will be set forth at length in the following description, where I shall outline in full that form of the invention which I have selected for illustration in the drawings accompanying and forming part of the present specification. In said drawings I have shown one form of calculating machine embodying my invention, but it is to be understood that I do not limit myself to such form, since the invention, as set forth in the claims, may be embodied in a plurality of forms.

Referring to said drawings.

My present invention is embodied in a calculating machine such as is shown in my United States Patent No. 1,643,710, of September 27, 1927, to which reference is hereby made for a disclosure of the complete calculating machine. In view of the existence of this prior patent, it is believed to be not necessary to disclose herein all of the mechanism entering into the construction of the complete calculating machine.

The machine shown in my prior patent, above referred to, comprises a rotary actuator which cooperates with a product register mounted on a transversely movable carriage. The machine is provided with a row of keys, which I have termed automatic multiplier keys, which predetermine the number of rotations of the actuator. The actuator is normally held locked in full cycle position and, upon depression of one of the automatic multiplier keys, the actuator is unlocked and rotated for a number of times equal to the value of the automatic multiplier key and is then locked in full cycle position. In such prior machine, the carriage is then shifted to the next numerical order by hand, and, in the present application, means are provided for automatically shifting the carriage to the next numerical order, upon the completion of the operation caused by the depression of one of the automatic multiplier keys.

In my co-pending application, Serial No. 206,516, filed July 18, 1927, I have shown means, which are effective only when the machine is set to perform problems in division, for automatically stopping the actuator when the proper quotient figure appears in the quotient register, and to then automatically shift the carriage to its next position. Some of the mechanism disclosed in said co-pending application is employed in the machine of the present application, to cause transverse shifting of the carriage, when the machine is set to perform problems in multiplication, at the completion of the predetermined number of rotations of the actuator, and reference is made to said co-pending application for a disclosure of such parts as are common to the machines of the two applications.

The present machine embodies a rotary actuator, as is disclosed in my prior patent, into which values are introduced by the depression of keys. The actuator is driven by an electric motor and the connection between the motor and the actuator is controlled by a clutch, so that the number of rotations of the actuator may be controlled by the operator, either manually or by the depression of one of the keys which predetermines the number of rotations of the actuator. The values introduced into the actuator are transmitted, on rotation of the actuator in either direction, to the figure discs of the counting mechanism, which, for the purpose of making direct action of the selected values on the figure discs of highest value possible, is disposed in parallel displaceable relation to the axis of the actuator. The counting mechanism comprises a series of numeral wheels which are mounted on a carriage which is displaceable transversely of the calculating machine, with respect to the actuator. The carriage may be moved transversely by hand, as is shown in my prior patent, or may be automatically moved transversely, by the employment of the mechanism disclosed herein, when the machine is set to perform problems in multiplication.

Figure 6:
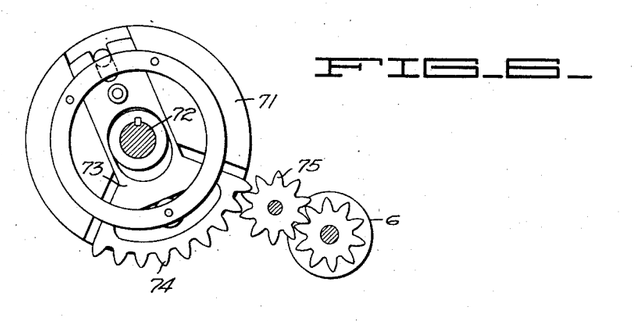
Fig. 6 is a detail showing the actuator in engagement with the counting mechanism.

The machine includes a driving shaft 2, which is connected to the motor 3, so that it rotates therewith. The driving shaft 2 is connected to and disconnected from the actuator 4 by control mechanism, such as is disclosed in my said patent, which serves to control the operation of the clutch contained within the clutch housing 5. The particular actuator referred to comprises a plurality of discs 71 secured to the actuator shaft 72. each disc carrying a slide 73, provided with an arcuate rack 74, adapted, on rotation of the shaft, to engage the intermediate wheel 75 of the counting mechanism and advance the numeral wheel 6 the selected number of steps. The clutch housing is connected to the actuator through suitable gearing, so that it rotates therewith. The clutch housing 5 is normally disconnected from the driving shaft 2 and these two elements are connected in driving relation, only when the machine is in operation. On rotation of the actuator 4 the values entered therein are transmitted to the figure discs 6 (Fig. 6) of the product register, which is mounted in the transversely movable carriage 7.

The carriage is moved transversely, step by step, in either direction, by rocking the lever 8 to either side of its normal position. The lever 8 is rockable manually, as is shown in my aforesaid patent, and it is also rockable automatically, when the machine is set to perform problems in multiplication, by the completion of the calculation in one numerical order.

Figure 7:
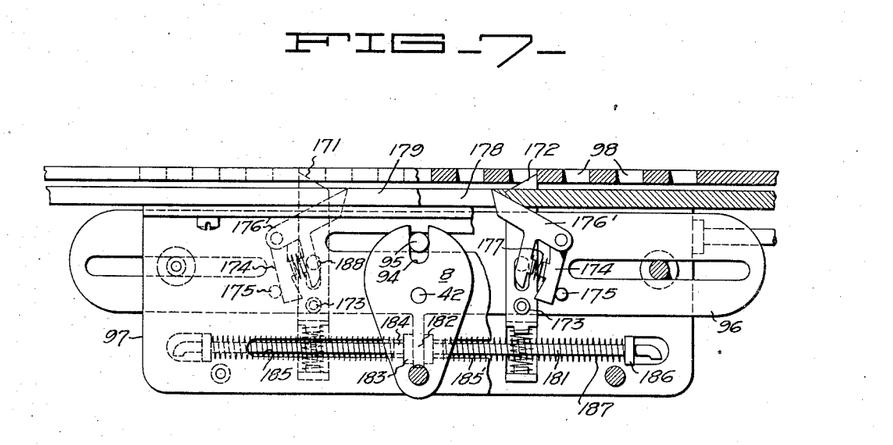
Fig. 7 is an elevation of the carriage moving mechanism.

The lever 8 is rockable in either direction from normal position and cooperates with a carriage moving mechanism such as is shown in my co-pending application, Serial No. 230,988 of November 4, 1927, which is a division of my prior application Serial No. 539,422 of February 27, 1922. This mechanism is shown in Fig. 7, and comprises a slide 96 carrying the pin 95 which is engaged by the lever 8. The carriage 7 is mounted on the frame 97, and is provided on its under surface with a plurality of spaced depressions 98, having a spacing equal to the spacing of the numeral wheels of the counting mechanism.

Mounted in the frame 97 and slidable vertically therein, are two upwardly spring pressed dogs 171, and 172, having bevelled upper ends, adapted to engage against the side of the depressions or apertures 98 on the under side of the carriage. The dog 171 bears against the left side wall of a depression, preventing movement of the carriage to the right, and the dog 172 bears against the right side wall of another depression, preventing movement of the carriage to the left. The carriage is thus normally locked in position against longitudinal movement, and due to the use of the two dogs, has no sideplay. Arranged on each dog is a roller 173, which is engaged by a pivoted dog to depress the latch. Pivoted on the slide 96, adjacent each dog, is a dog 174, which is prevented from moving backward, away from the roller 173, by a stop 175 on the slide. When the slide is moved to move the dog 174 toward the roller, the lower flat inclined surface 176 of the dog 174, rides over the roller, forcing it and its associated sliding dogs downward out of contact with the carriage. Pivoted to the slide 96 on the same axis as the dog 174, is a pawl 176', which, when released, is forced upward by the spring 177 interposed between the pawl and the dog 174. The pawl extends through an aperture or elongated slot 178 in the top plate 179 of the frame 97 and is normally held out of engagement with the carriage, by contact with the end of the slot. The slot 178 is provided with bevelled ends against which the pawl 176 lies, the angle of the bevel corresponding to the slope of the upper surface of the contacting pawl, when the pawl is in normal position, as shown in Fig. 7. Due to the bevel, the length of the slot of the upper surface of the plate 179 is less than its length on the under face. The length of the slot on the upper face is equal to the distance between two adjacent ends of the pawls 176' when the pawls are in normal position. When the slide 96 is moved toward the left, the right hand dog 174 depresses the dog 172, releasing the carriage so that it may be moved toward the left. Simultaneously, the right-hand pawl 176' moves upward into the next depression in the carriage, and continued movement of the slide to the left causes the right-hand pawl 176 to move the carriage to the left. As the carriage is moving to the left and before it reaches the end of its throw, the right-hand dog 174 passes from the roller 173, permitting the dog 172 to spring upward into the next depression in the slide, to the right of the depression from which it was withdrawn, so that the dog is in position to stop the movement of the carriage at the end of its step of movement. On movement of the carriage to the left, the dog 171 is depressed by engagement of the side of the depression with the bevelled side of the dog and springs into the next depression after the carriage has been moved one step. As the slide moves back to its central or neutral position, the right-hand dog 174 snaps over the roller 173 to its normal position against the stop 175. Associated with the dog 171 is a corresponding dog 174 and latch 176', together with the other elements which function as indicated above, for movement of the carriage to the right.

Means are provided for returning the slide 96 and the lever 8 to central or neutral position, after the movement of the slide one step in either direction. Supported in the frame 97, below the slide 96 is a rod 181, which extends through an aperture in an ear 182 on the lower side of the slide at substantially the center thereof. Disposed on the rod 181, at each side of the ear 182, is a washer 183 provided with a stud or projection 184, the projection seating in the aligned slots 185 and 185', respectively in the frame 97, the slots being of such length that when the studs are positioned in the adjacent ends of the two slots, the ear is held in central or neutral position. Arranged on the end of each of the rods, between the washer 183 and the abutment 186 through which the rod passes, is a normally inactive spring 187, which tends to hold the washer at the end of the slot. The spring tends to return the slide to neutral or central position, after it has been moved in either direction by the lever 8.

The present machine is provided with a row of keys 12 for predetermining the number of rotations of the actuator, depression of any key 12 serving to cause the actuator to rotate a number of times equal to the value of the key. The construction and mode of operation of these automatic multiplier keys and the control device associated therewith are fully described in my said patent above referred to. The automatic control mechanism includes a settable lever 13, which is set in adjusted position by depression of one of the keys 12. This lever positions a slide 14, carrying a pin 15, which, upon movement of the slide, contacts with the stepped plate 16, causing backward movement of the stepped plate. The slide 14 is moved backward one step for each rotation of the actuator, bringing the pin 15 into contact with, and moving backward the stepped plate 16. The slide 14 is pivotally connected to a rack 17 as shown in Fig. 7, in my United States Patent No. 1,643,710, in which these parts are numbered 277 and 267, respectively, which is in mesh with the sprocket 18, which is in turn advanced by the tooth 19, carried by the clutch housing 5. Backward movement of the slide 16 releases certain devices which serve to disengage the clutch and lock the clutch housing 5 in full cycle position. These devices are fully disclosed in my said patent above referred to. After effecting the operation of these devices, the stepped plate 16 again moves forward to its normal position. In the present embodiment of the invention, the forward movement of the stepped plate 16 is employed to control the operation of the power driven means for shifting the carriage. Extending laterally from the stepped plate 16, or trip slide, as it is sometimes termed, is a foot or extension 21, provided on its outer end with a cam member 22, which cam member, in its forward movement, serves to control the carriage shifting mechanism.

Figure 1:
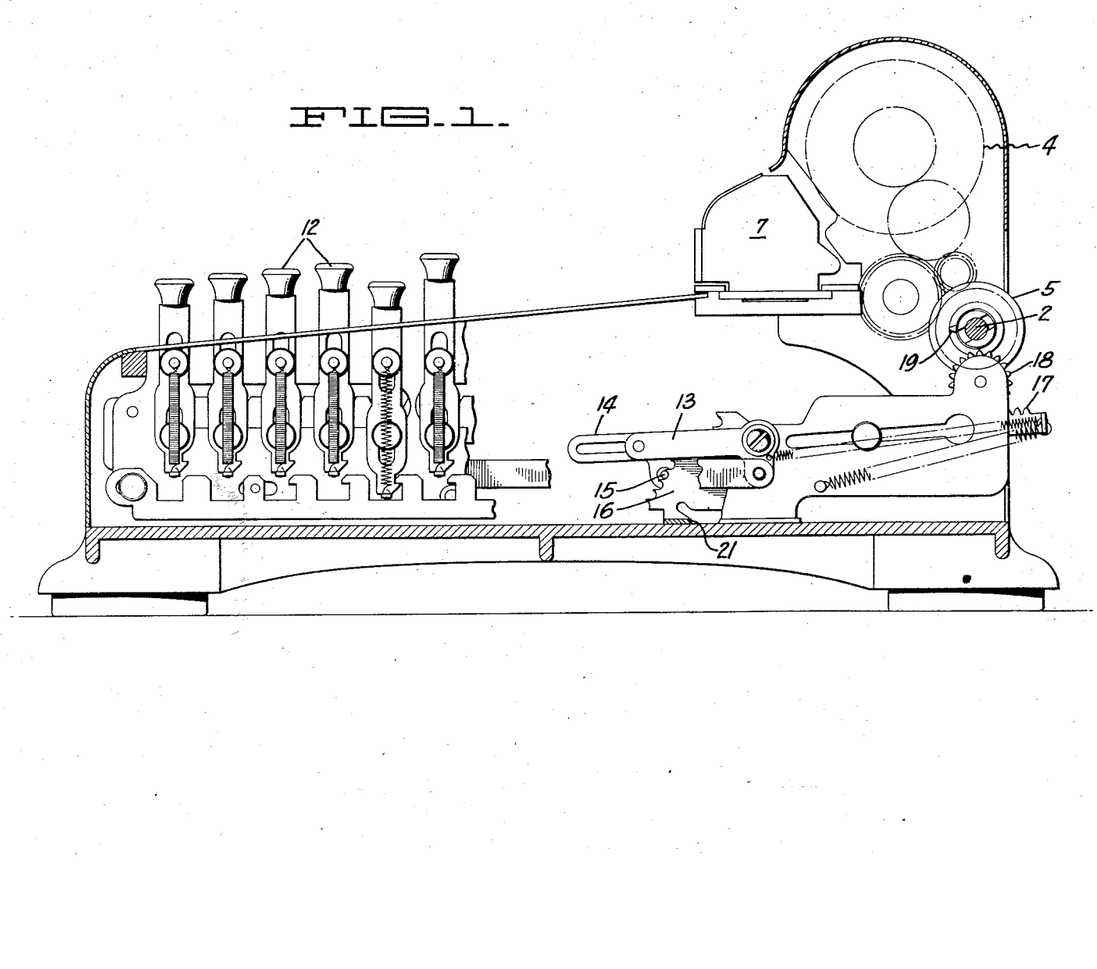
Fig. 1 is a vertical longitudinal section through a calculating machine embodying my invention, parts of the mechanism being broken away to more fully disclose the construction.
Figure 2:
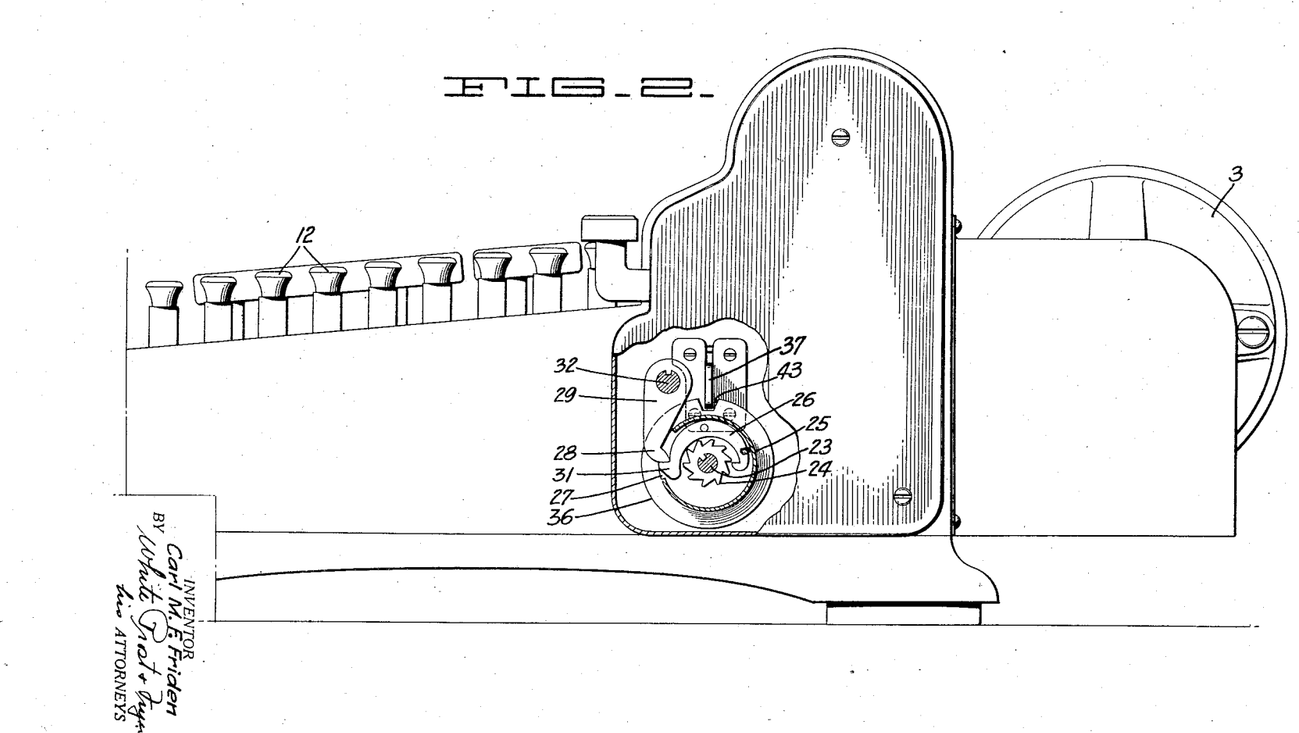
Fig. 2 is a side elevation of a portion of a calculating machine embodying my invention, a portion of the casing being broken away, and a portion of the mechanism being shown in sections, to disclose the means for shifting the carriage.

Power for shifting the carriage is taken from the driving shaft 23 (Fig. 2), which is connected to the motor, so that it rotates therewith, as is shown in my co-pending application above referred to. Secured to the driving shaft 23 is a ratchet wheel 24 and surrounding the ratchet wheel 24 is a clutch housing 25, carrying a pawl 26, which is adapted to engage the ratchet wheel 24, to cause engagement of the clutch. The housing is provided with a peripheral aperture 27, through which the foot 28 on the end of the lever 29 extends into contact with the nose 31 on the pawl 26. The parts are normally in the position shown in Figure 2, with the foot 28 in contact with the nose 31, holding the pawl 26 from engagement with the ratchet wheel 24. Upon clockwise movement of the lever 29, the foot 28 is withdrawn from contact with the nose 31, and moved beyond the periphery of the housing 25, thereby unlocking the clutch housing and permitting the pawl 26 to engage the ratchet wheel 24, thereby transmitting motion to the clutch housing 25. The lever 29 is secured to the shaft 32 and means are provided for moving the shaft 32 at the proper time to accomplish the unlocking and the engagement of the clutch and the locking and disengagement of the clutch.

Figure 3:
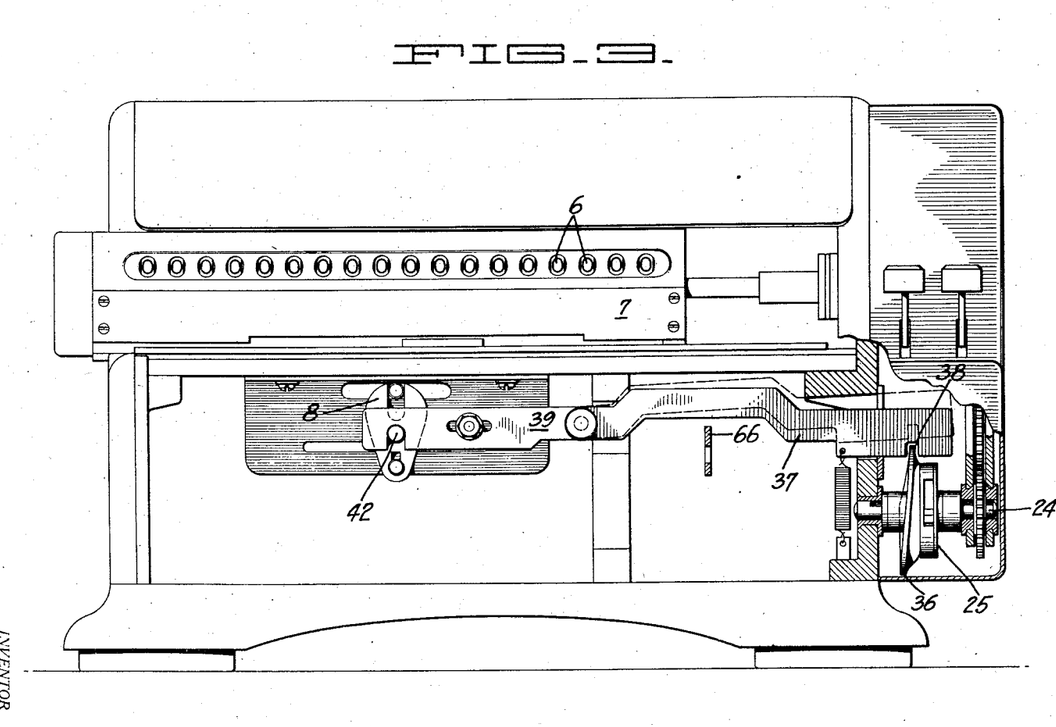
Fig. 3 is a transverse section through a calculating machine embodying my invention, showing the carriage shifting means.

Secured to the clutch housing 25 is a cam 36, constructed to produce transverse oscillation of an associated element. Associated with the cam 36 is a bar 37 (Figs. 2 and 3), having a notch 38 therein, within which the cam is disposed so that a complete rotation of the cam causes a transverse oscillation of the bar 37. At its other end, the bar is pivoted to the slide 39, which engages the pin 42, secured to the rocking lever 8, so that for one rotation of the cam 36, the lever 8 is rocked to move the carriage from one order to the next.

The cam 36 is provided in its periphery with a notch 43, which, when the cam is stopped in full cycle position, lies in the plane of the bar 37 so that the bar may be moved transversely while the clutch is held locked in full cycle position. This permits the operation of the rocking lever 8, by hand.

Figure 4:
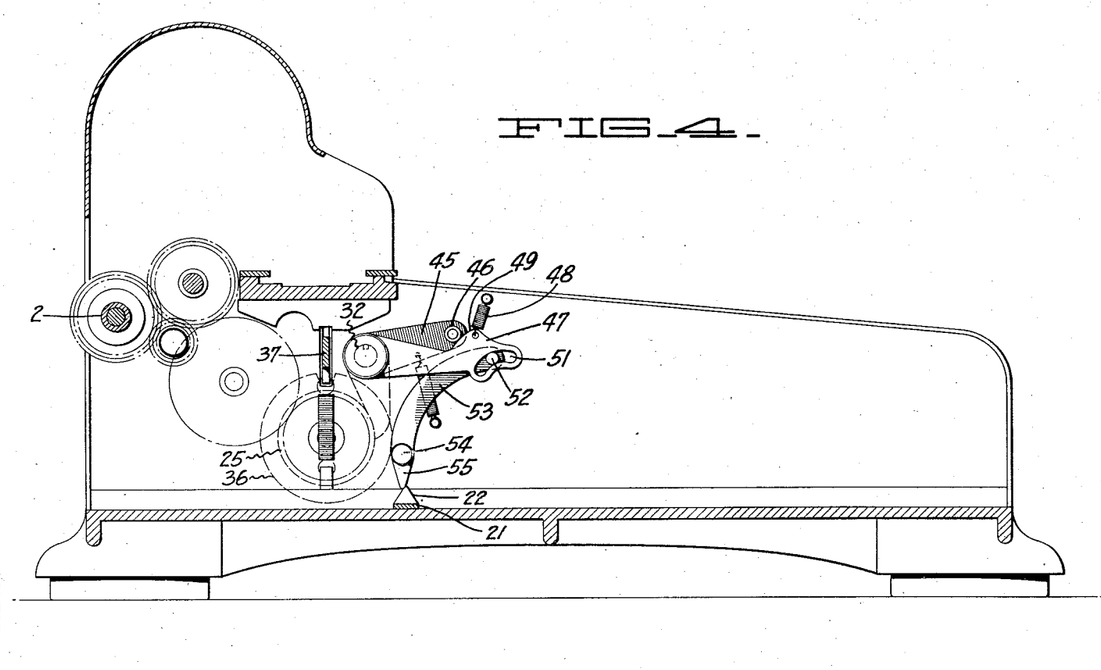
Fig. 4 is a vertical longitudinal section through a calculating machine showing the means for controlling the operation of the carriage shifting means.
Figure 5:
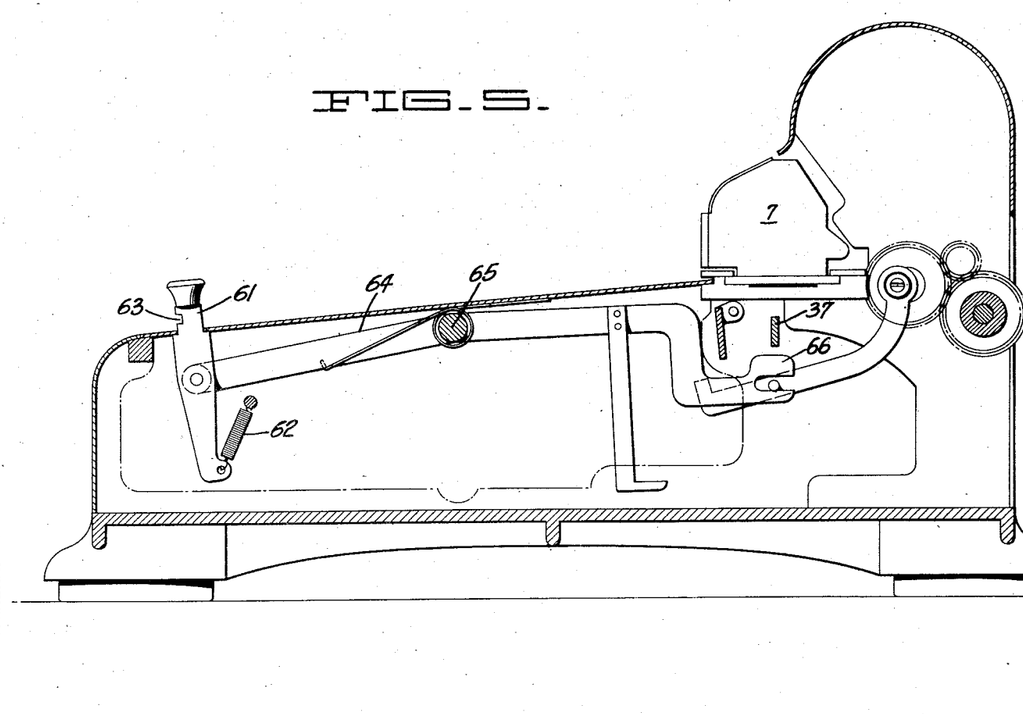
Fig. 5 is a vertical longitudinal section through a calculating machine embodying my invention, showing the means for disabling the automatic carriage shifting means, when the machine is set for performing problems in addition and subtraction.

By rocking the shaft 32 in a clockwise direction, the clutch housing 25 is released and the clutch engaged to cause rotation of the housing and the consequent shifting of the carriage. Means are provided for automatically rocking the shaft 32 at the completion of a calculation in one numerical order and, in the present instance, the rocking of the shaft 32 is effected by the forward movement of the stepped plate or trip slide 16. Secured to the shaft 32 is a lever 45, Fig. 4, which is provided on its free end with a roller 46. Freely and rotatably mounted on the shaft 32, substantially contiguous to the lever 45, is a second lever 47, which is normally held upward by the spring 48, so that the cam surface 49 on the lever is in contact with the roller 46. The lever 47 is provided with a slot 51, preferably curved, in which is disposed a pin 52, carried by the lever 53, which is pivoted at 54 to the frame of the machine. The short lever arm 55 of the lever 53 normally lies in contact or in substantial contact with the rear face of the cam member or trip member 22, which is secured to the slide 16. The motion of the slide 16 is slight and the purpose of the levers 53 and 47 is to multiply this motion and transmit it to the lever 45. Normally, the cam 22 lies immediately in front of the lever arm 55, as shown in Fig. 4, and, on backward movement of the slide 16, the cam 22 moves backward past the lower end of the lever arm 55 and produces an idle rocking of the lever 53. Upon release of the slide 16, it is moved forward by suitable springs and, in moving forward, the projection or cam 22 rocks the lever 53 in a counter-clockwise direction, thereby rocking the lever 47 and consequently the lever 45 to a sufficient extent to move the foot 28 of the lever 29 out of the aperture in the clutch housing 25.

When the cam 22 has passed the lever arm 55, the parts return to their normal position and the foot 28 rides against the periphery of the clutch housing and, at the end of one revolution thereof, drops into the aperture therein, engages the pawl 26, disconnecting the clutch and locking the clutch housing in full cycle position. Means are provided for disabling the automatic carriage shifting mechanism when it is desirable to employ the machine in problems of addition and subtraction. The machine is provided with an "addition" or "non-repeat" key 61, which, when depressed, positions other mechanism of the calculating machine so that it will function properly in problems of addition. The key 61 is normally held in its elevated or repeat position by the spring 62, and is provided with a notch 63, whereby it may be latched in depressed position. Pivoted to the key 61 is a lever 64, fulcrumed at 65, and extending backward into the machine so that the rear end 66 thereof underlies the bar 37. When the key 61 is depressed, the rear end 66 of the lever is raised, rocking the bar 37 about its pivot and raising the end thereof from engagement with the cam 36, so that rotation of the cam is ineffective with respect to shifting the carriage.

I claim:

1. In a motor driven calculating machine, numeral wheels, a transversely movable carriage on which said wheels are mounted, means for moving said carriage, a rotary actuator for the numeral wheels, means for predetermining the number of revolutions of the actuator comprising a plurality of value keys of different denominations, a trip device common to all of said keys, means operated by the depression of any value key for initiating the calculating operation and differentially positioning the trip device, a member actuated by the trip device for terminating the calculating operation and means actuated by said member for controlling said carriage moving means.

2. In a motor driven calculating machine, numeral wheels, a transversely movable carriage on which said wheels are mounted, means for moving the carriage, a normally disengaged clutch between the motor and the carriage moving means, a rotary actuator for the numeral wheels, means for predetermining the number of revolutions of the actuator including a plurality of value keys and means brought into operation at the end of the predetermined number of revolutions for causing engagement of said clutch.

3. In a calculating machine, comprising numeral wheels, actuating mechanism therefor, and means for effecting relative lateral shifting of said wheels and said mechanism; driving means, a series of value keys each operable to initiate operation of said mechanism, means differentially settable by said keys for arresting such operation, and means controlled by said arresting means for operating said shifting means by said driving means.

4. In a calculating machine, comprising numeral wheels, actuating mechanism therefor, and means for effecting relative lateral shifting of said wheels and said mechanism; driving means, a series of value keys each operable to initiate and determine operations of said mechanism, means responsive to operations of said keys for controlling operation of said shifting means by said driving means, and means comprising a manually settable member for disabling said key responsive means.

In testimony whereof, I have hereunto set my hand.

CARL M. F. FRIDEN.